United States Patent Office 3,320,067
Patented May 16, 1967

3,320,067
COMPOSITION AND PROCESS UTILIZING PHOTOSPIRANS
Lloyd D. Taylor, Everett, Mass., assignor to Polaroid Corporation, Cambridge Mass., a corporation of Delaware
No Drawing. Filed Sept. 3, 1963, Ser. No. 306,325
4 Claims. (Cl. 96—90)

This invention relates to phototropic substances, particularly photospirans and more particularly to products, compositions and processes utilizing said photospirans.

It is known that certain classes of chemical compounds known as phototropic compounds undergo a photochemical change upon exposure to radiant energy, whereby the color characteristics of the compound are temporarily altered. The phototropic compounds with which this invention is concerned are photospirans.

As used herein, "phototropism" and "phototropic" define a reversible change in color of a substance when exposed to radiant energy. It is believed that the color change is produced by the formation of isomeric modifications of the compound, and when the influence of the radiation is removed the compound is restored to its original condition subject to further change of color when the radiation is reapplied. If the photospiran is more sensitive to heat and/or ultraviolet radiation, the photospiran will assume what is known as the "open" form. If the photospiran is more sensitive to visible light, the photospiran will change to the "closed" form. Photospirans generally exist in a colored state in the open form and in an uncolored or bleached or differently colored state in the closed form.

One object of this invention is to provide novel water-soluble photospirans.

Another object of this invention is to provide a novel process for the preparation of novel water-soluble photospirans.

Another object of this invention is to provide a novel photospiran which is converted from a colored to a colorless state under the influence of visible radiation.

Still another object of this invention is to provide novel optical elements utilizing the novel water-soluble photospirans of this invention.

Still another object of this invention is to provide polymeric films containing photospirans.

Still another object is to provide novel photospirans which will undergo an irreversible change to the colored state.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The novel water-soluble photospirans of this invention are spirans which contain a water-solubilizing group, preferably in the 8' position. One method of preparing such photospirans is by replacing the chlorine radical on 3-chloromethyl-5-nitrosalicylaldehyde with a water-solubilizing group and reacting the thus-formed compound with a methylene base. The term "methylene base," as used herein, is intended to define the product of the reaction of a quaternized 2-alkyl heterocyclic compound with alkali or organic bases. Such products are also known as anhydro bases. The term "water-solubilizing group," as used herein, is intended to refer to a group which will impart solubility in water to the compound. However, such a group should not render the compound non-thermochromic or non-phototropic.

The novel water-soluble photospirans of the present invention may be represented by the formula:

(A)
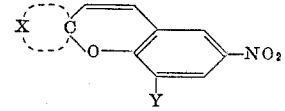

wherein X is the residue of a methylene base and Y is a water-solubilizing group.

The term "residue of a methylene base," as used herein, is intended to refer to the methylene base portion of the compound after condensation of said methylene base with the particular salicylaldehyde to form the photospiran. The term "X" may also be defined as the atoms necessary to make up a methylene base after said methylene base has been condensed with the particular salicylaldehyde.

The preferred water-soluble photospirans of Formula A may be represented by the formula:

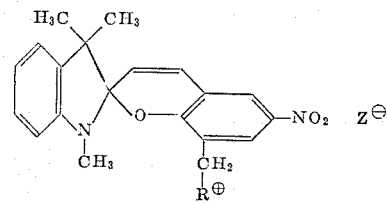

wherein $R^\oplus$ is a quaternized tertiary amine radical of not more than 16 carbon atoms and Z is an anion.

As examples of other water-solubilizing groups in addition to quaternized tertiary amines, mention may be made of $-SO_3^\ominus Na^\oplus$, $-COO^\ominus Na^\oplus$ groups and amine acid salts, e.g., $D^\oplus H\ Z^\ominus$, where D is a tertiary amine radical of not more than 16 carbon atoms and Z has the same meaning as above.

The novel water-soluble photospirans of Formula B may be prepared by reacting a tertiary amine containing not more than 16 carbon atoms, with 3-chloromethyl-5-nitrosalicylaldehyde and adding 2-methylene-1,3,3-trimethylindoline to the solution of the thus-formed quaternized compound.

It should be noted that other methylene bases as well as 2-methylene-1,3,3-trimethylindoline may be used to prepare the novel compounds of this invention. As examples of such methylene bases, mention may be made of:

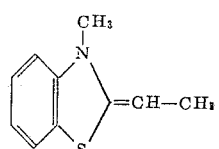

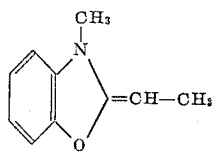

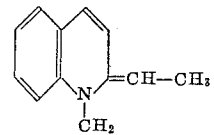

As other examples of novel water-soluble photospirans within the scope of this invention, mention may be made of the following:

(1) 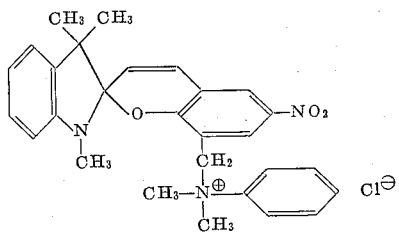

(2) 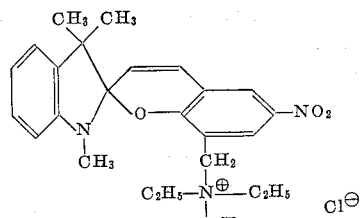

(3) 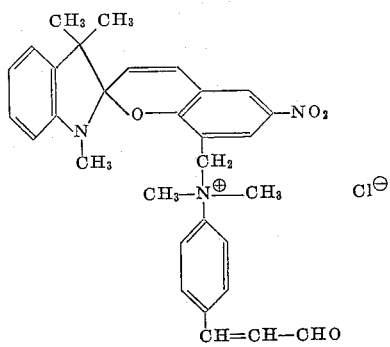

(4) 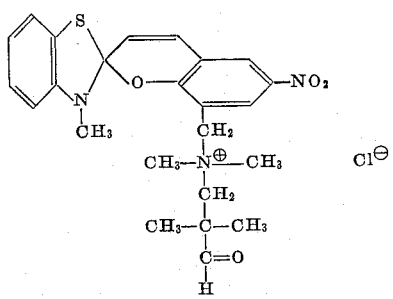

(5) 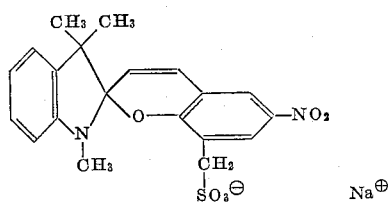

(6) 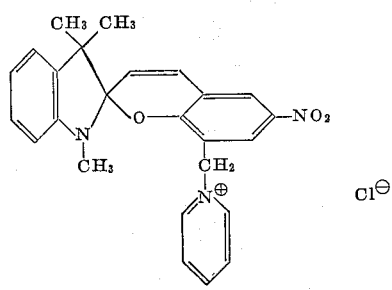

(7) 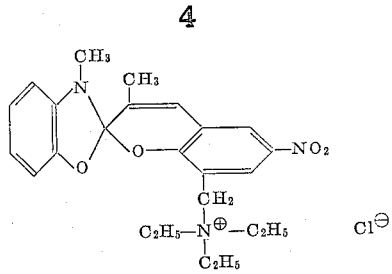

(8) 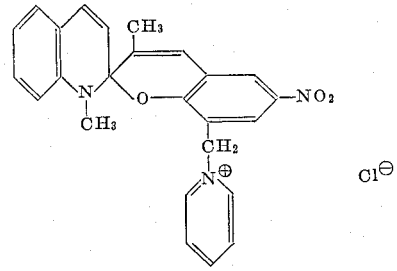

(9) 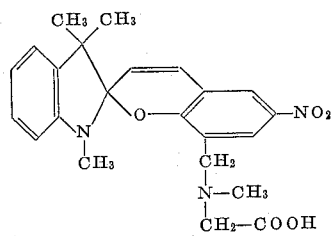

(10) 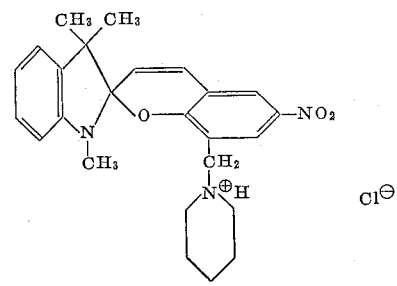

The compound of Formula 5 may be prepared by reacting sodium sulfite with 3-chloromethyl-5-nitrosalicylaldehyde and then reacting the resulting compound with 2-methylene-1,3,3-trimethylindoline.

The compound of Formula 9 may be prepared by reacting methylamino acetic acid with 3-chloromethyl-5-nitrosalicylaldehyde and then reacting the resulting compound with 2-methylene-1,3,3-trimethylindoline.

The following nonlimiting examples illustrate the preparation of the novel water-soluble photospirans within the scope of the present invention.

EXAMPLE 1

4.3 gm. (0.02 mole) of 3-chloromethyl-5-nitrosalicylaldehyde (prepared according to the method disclosed and claimed in the copending application of Lloyd D. Taylor et al., Ser. No. 220,035, filed August 28, 1962) was placed into a 100 ml. flask with 50 ml. of dry acetone and 1.58 gm. of (0.02 mole) of pyridine. This mixture was allowed to stand 3 hours and the thus-formed yellow solid, 2-hydroxy-3-formyl-5-nitrobenzylpyridinium chloride, was then separated and 5.6 gm. (0.019) was placed in a 1 liter, round bottom, 3-necked flask to which was added 300 ml. of dry ethanol. The solid was dissolved by refluxing. To the hot solution was added 3.6 gm. (0.019 mole) of 2-methylene-1,3,3-trimethylindoline. The thus-formed solution was then refluxed for 5 hours and then cooled to room temperature. After evaporation of ethanol to approximately 30 ml.

of solution, crystallization occurred. 5.5 gm. of a purple solid,

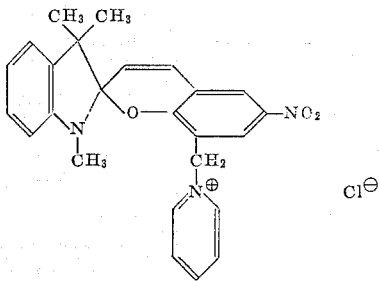

was recovered.

EXAMPLE 2

Into a 100 ml. round bottom flask, fitted with a reflux condenser with a $CaCl_2$ drying tube, was placed 2.65 gm. of 3-chloromethyl-5-nitrosalicylaldehyde and 50 ml. of dimethyl formamide. An equivalent amount of sodium sulfite (2.04 gm.) was added and the mixture was refluxed for 2 hours at 150° C. A cloudy brownish solution resulted. An equivalent of 2-methylene-1,3,3-trimethylindoline (2.2 ml.) was added to the solution and the resulting purple solution was refluxed for two hours and then allowed to stand overnight at room temperature. The solution was then filtered and the filtrate was poured into 500 ml. of dried ethyl ether. 2.5 gm. of a red solid,

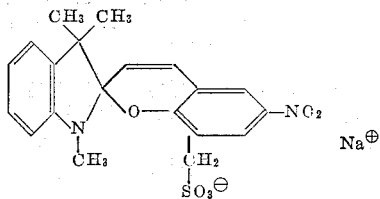

was recovered. The infrared absorption spectra of the compound showed the characteristic S—O stretch bond at 1250 cm.$^{-1}$.

The spiran in water solution was light orange in color and turned red upon heating on a steam cone. The red color was bleached by exposure to visible light. Upon exposure to ultraviolet light, the spiran solution turned red and was also bleached by visible light.

EXAMPLE 3

The photospiran

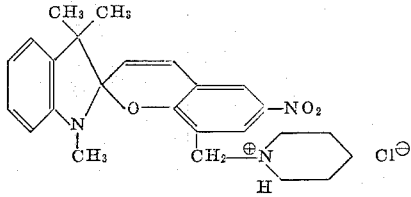

was prepared in the following manner. To a solution of 21.5 gm. (0.1 mole) of 3-chloromethyl-5-nitrosalicylaldehyde in 2 liters of dry benzene was added 17.0 gm. (0.2 mole) piperidine. The resulting precipitate was removed by filtering and dissolved in 1 liter of water and sufficient hydrochloric acid to dissolve the precipitate. The solution was neutralized with sodium hydroxide. The product, 3,N-piperidinomethyl-5-nitrosalicylaldehyde, was filtered and dried, decomposes at about 235° C. and showed the following analysis for $C_{13}H_{16}N_2O_4$:

Calculated: C, 59.1; N, 6.1; H, 10.6. Found: C, 58.9; N, 6.1; H, 10.7.

It is believed that 3,N-piperidinomethyl-5-nitrosalicylaldehyde exists as a Zwitterion in both the solid and in solution.

A solution containing 400 cc. of absolute ethanol, 5.19 (0.03 mole) of 2-methylene-1,3,3-trimethylindoline and 7.09 (0.03 mole) of 3,N-piperidinomethyl-5-nitrosalicylaldehyde was refluxed for 16 hours. The solution was filtered and the filtrate allowed to crystallize. The product was filtered and redissolved in 500 cc. of absolute ethanol and was neutralized with one equivalent of hydrochloric acid. The spiran melted at 216° C.

The novel water-soluble photospirans of this invention in their open form exhibit a predominant sensitivity to visible light. As stated above, sensitivity to visible light results in the transformation of the colored form to the closed or uncolored form. The rate of response to visible radiation is very high in the compounds of this invention. The rate of response is further enhanced, of course, when the compound is in solution. A solution of a photospiran of this invention bleaches almost instantaneously upon exposure to a high intensity source of visible radiation such as a photographic flash lamp (Sylvania Press 25 or 25B bulb at a distance of about 5 inches). A weaker source of visible light such as north window light will bleach the spiran within a few minutes. Ultraviolet light, even from a weak source, will readily open the novel photospirans of the present invention. As an example of a suitable ultraviolet source, mention may be made of Ultraviolet Lamp Model TF 250, sold by the Black Light Eastern Corp., Manhasset Avenue, Port Washington, N.Y.

The reversible photoreaction occurs readily in the novel photospirans of this invention either in a solvent or in a solid phase, but it has been found that the reaction proceeds more rapidly and with a less intense application of radiant energy in a solvent and that the ease of activation is a function of the particular solvent. For example, the opening reaction of compound of Formula 10 proceeds more readily in ethanol and acetone than in water. The color of the photospiran has also been found to be dependent upon the particular solvent.

It has been found that the novel photospirans of this invention incorporated into molecularly oriented polymers, e.g., molecularly oriented polyvinyl alcohol, exhibit a positive dichroism. Such elements may be useful as polarizers.

It has been found that the quaternary photospirans of this invention, particularly those within Formula B, can be irreversibly transformed to a colored form. This transformation may be carried out by the application of heat or ultraviolet light to a spiran in a polar polymer, e.g., polyvinyl alcohol, to provide the colored form and then the application of more intense heat, i.e., around 100 to 150° C., to provide the new irreversible species. It is believed that the application of the above-described relatively intense heat results in the loss of tertiary amine from the compound whereby a new, nonthermochromic dye is formed. The above-described reaction is useful in photocopy processes involving the heat development of a colored, permanent image.

Photospirans in non-polar films have generally been found to resist the formation of a colored species and readily revert to a colorless form from a colored form by the action of heat. It has now been found, however, that the novel photospirans of the present invention do not follow the above-described behavior in non-polar films. For example, a film comprising polymethylmethacrylate and the compound of Formula 6 was cast on a glass plate in a ratio of 4 parts polymer to 1 part spiran. The dried film was stripped and the following investigation of the thermochromic and phototropic qualities of the film were carried out.

(A) The entire film was exposed to a source of ultraviolet light at a distance of 5 inches for about 30 seconds whereupon the film turned red-purple in color. Upon exposure to north window light, the film bleached in about 1 minute.

(B) One-half of the film was shielded while the other half was heated to about 100–150° C. for about two minutes. An intense blue color formed, which, on continued heating, disappeared. Upon exposure of the entire film to a source of ultraviolet light, the portion of the film that had been heated turns blue in color, while the portion of the film which had been shielded from the heat turned purple. Both areas of the film were then exposed to visible light and both areas bleached.

In the foregoing experiment, it was noted that the blue form of the photospiran was easier to generate and easier to bleach.

Other photospirans of the present invention were found to behave in a similar manner.

Since certain changes may be made in the above products, compositions and processes without departing from the scope of the invention herein involved, it is intended that all matter contained in the above description shall be interpreted as illustrative and not in a limiting sense.

What is claimed is:

1. A composition of matter capable of undergoing a reversible color change when exposed to radiant energy, comprising a polymeric film having dispersed therein a water-soluble photospiran of the formula:

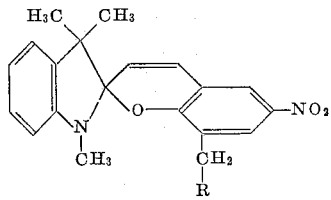

wherein R is a radical selected from the group consisting of —R'⊕Z⊖ wherein R'⊕ is a quaternized amine of not more than 16 carbon atoms and Z⊖ is an anion;

—SO₃⊖Na⊕

—COO⊖Na⊕; and —D⊕HZ⊖ wherein D⊕ is a tertiary amine radical of not more than 16 carbon atoms and Z⊖ is an anion in which film the property of dichroism is exhibited.

2. A product as defined in claim 1 wherein said polymeric film is molecularly oriented polyvinyl alcohol.

3. A process for providing an irreversibly colored compound comprising the steps of exposing to radiant energy and thereby transforming to the colored form, in a polar polymeric film, a photospiran of the formula:

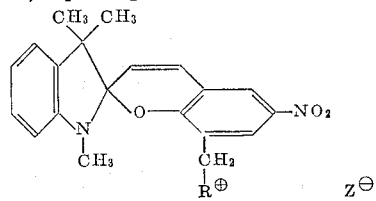

wherein R⊕ is a quaternized amine of not more than 16 carbon atoms and Z⊖ is an anion, and heating said colored photospiran to a temperature of about 100°–150° C., thereby liberating tertiary amine.

4. A process as defined in claim 3 wherein R⊕ is

References Cited by the Examiner

UNITED STATES PATENTS

| | | | |
|---|---|---|---|
| 3,100,778 | 8/1963 | Berman | 260—319 |
| 3,205,072 | 9/1965 | Agruss | 96—90 |
| 3,212,898 | 10/1965 | Cerreta | 96—90 |
| 3,214,438 | 10/1965 | Youngdale | 260—319 |

NORMAN G. TORCHIN, *Primary Examiner.*

C. E. DAVIS, *Assistant Examiner.*